C. HILL.
HOSE COUPLING.
APPLICATION FILED NOV. 13, 1909.
995,966.
Patented June 20, 1911.
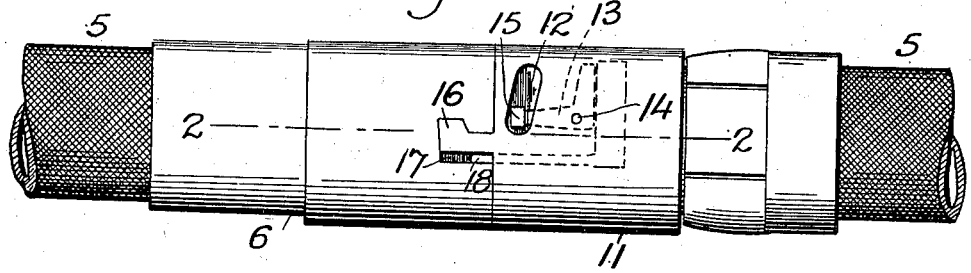
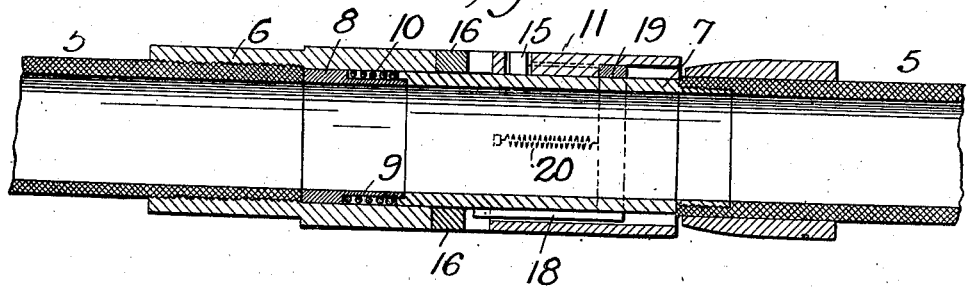
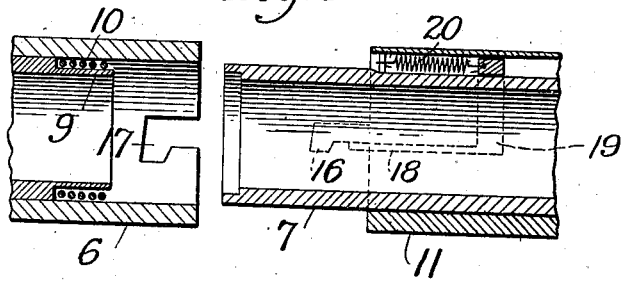
WITNESSES:
James P. Duhamel
William S. McDowell.
INVENTOR,
Charles Hill,
BY
Victor J. Evans.
ATTORNEY

UNITED STATES PATENT OFFICE.

CHARLES HILL, OF PHOENIX, BRITISH COLUMBIA, CANADA.

HOSE-COUPLING.

995,966.           Specification of Letters Patent.    Patented June 20, 1911.

Application filed November 13, 1909. Serial No. 527,883.

*To all whom it may concern:*

Be it known that I, CHARLES HILL, a subject of the King of Great Britain, residing at Phoenix, in the Province of British Columbia and Dominion of Canada, have invented new and useful Improvements in Hose-Couplings, of which the following is a specification.

This invention relates to hose coupling and its object is to provide a cheap and simple means for locking together two sections of hose as will be more fully described in the following specification, set forth in the claims and shown in the drawings, wherein:

Figure 1 is a plan view of two sections of hose coupling. Fig. 2 is a sectional view through the line 2—2. Fig. 3 is a sectional view at right angles to Fig. 2 and showing the sections separated.

The ends of the sections 5—5 of the hose are provided with heads 6 and 7 secured thereto by any well known means. The head 6 incloses a sleeve 8 with a reduced portion 9 in which is curled a spring 10 against which the outer end of head 7 fits and compresses as shown in Fig. 2.

Attached to the outside of head 7 is a sleeve 11 which is slotted at 12 and recessed to provide for a bell crank lever 13 pivoted at 14 and having a head 15 which projects through the slot 12 to operate the lever as will be described later. Projecting in advance of the sleeve 11, are hooks 16 adapted to enter correspondingly shaped apertures 17 in the head 6. When these hooks are fitted in the apertures a space remains below same into which are drawn the filling piece or wedge 18 carried by a yoke 19 which is drawn forward by the spring 20 all of which are contained in suitable recesses within the sleeve 11.

When it is desired to uncouple the hose, the head or knob 15 is pushed forward in its slot rocking the lever 13 on its pivot and causing its inner arm to bear against the yoke 19, throwing it backward against this tension of spring 20 and withdrawing the filling piece or wedge 18 from the apertures 17 so that the head 7 may be slightly turned and the hook 16 permitted to leave the apertures. The pressure of the spring 10 assists in the separation of the two parts of the coupling in case that they should fit tightly. At the same time this spring acts as a packing to prevent the escape of water at the point where the coupling is actually made.

This invention provides a simple and cheap hose coupling and can be used for hot or cold gas or water because either metal or rubber packing may be used if desired and the parts are few and simple and not liable to get out of order. In the separation of the coupling, the relationship need be altered very slightly in a rotary direction in order to allow them to be separated.

It is obvious that I do not confine myself to the exact construction of the details as illustrated but they may be modified as occasion may demand without departing from the essential features above described.

What I claim as new and desire to secure by Letters Patent is:

1. In a hose coupling, the combination with a coupling member having a regular edge with L-shaped recesses, of a second member adapted to abut against the first, hooks carried by the second member, wedges also carried by the second member and adapted to force the hooks into engagement with the sides of the recesses, a yoke connecting the wedges and means for forcing the yoke backward to allow the removal of the hooks.

2. In a hose coupling, the combination with a coupling member having L-shaped recesses, of a second member having an interior recess, hooks carried by the second member and adapted to enter the L-shaped recesses, wedges playing beneath the hooks and between same and the lower walls of the L-shaped recesses, a yoke carrying the wedges and a bell crank lever playing in the recess and projecting through a slot in the second member to force back the yoke and permit of the removal of the hooks.

3. In a hose coupling, the combination with a member having L-shaped recesses, of a second member having an interior space and a slot, hooks projecting from the second member and adapted to engage in the L-shaped recesses, a yoke within the space in the second member having wedges at each end, and a bell crank lever pivoted in the space and operating on the yoke to force it backward so the wedges are withdrawn.

In testimony whereof I affix my signature in presence of two witnesses.

CHARLES HILL.

Witnesses:
 OLA LOFSTAD,
 CHAS. BERGSTROM.

---

Copies of this patent may be obtained for five cents each, by addressing the "Commissioner of Patents, Washington, D. C."